Dec. 15, 1953     O. E. SELLERS     2,662,655
SELF-LOADING TRAILER
Filed May 26, 1950     3 Sheets-Sheet 1
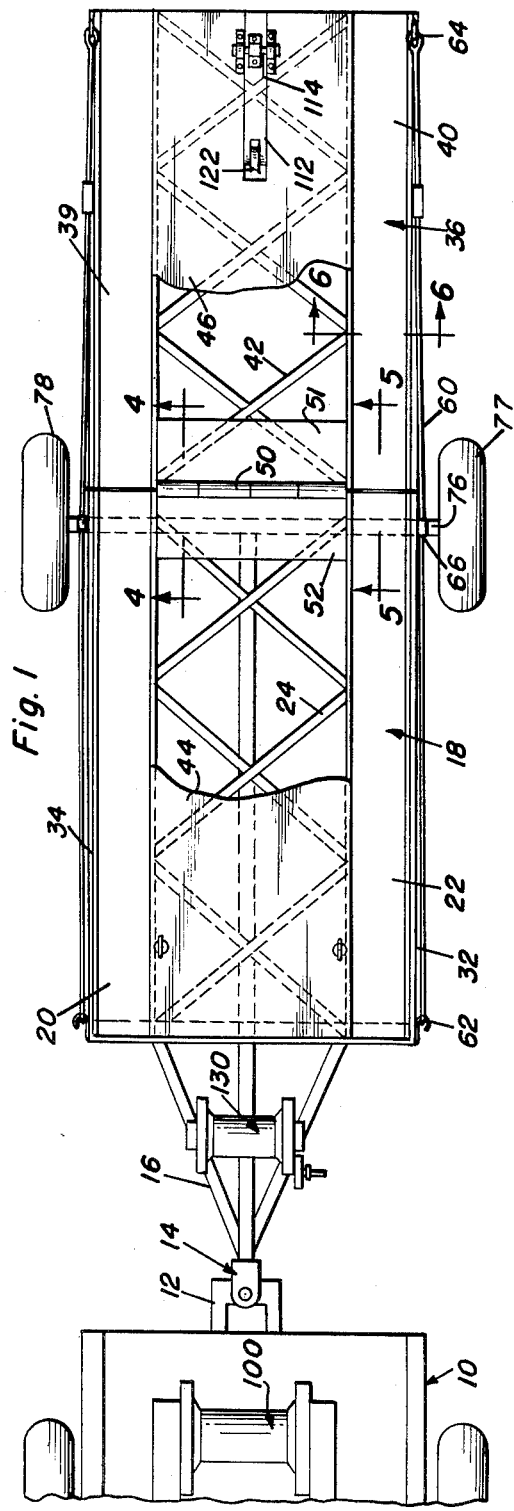
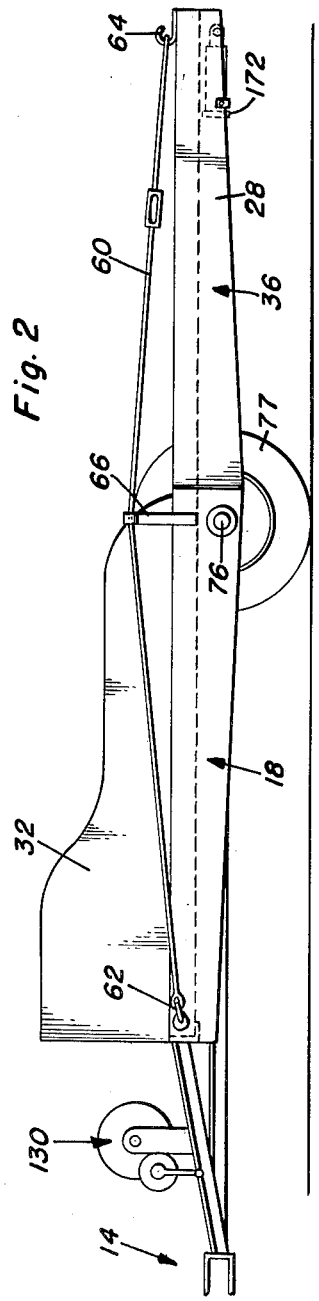
Orville E. Sellers
INVENTOR.
BY *Clarence A. O'Brien*
*and Harvey B. Jacobson*
Attorneys Dec. 15, 1953

O. E. SELLERS 2,662,655

SELF-LOADING TRAILER

Filed May 26, 1950

Orville E. Sellers
INVENTOR.

BY *Clarence A. O'Brien*
*and Harvey B. Jacobson*
Attorneys

Dec. 15, 1953     O. E. SELLERS     2,662,655
SELF-LOADING TRAILER
Filed May 26, 1950     3 Sheets-Sheet 3
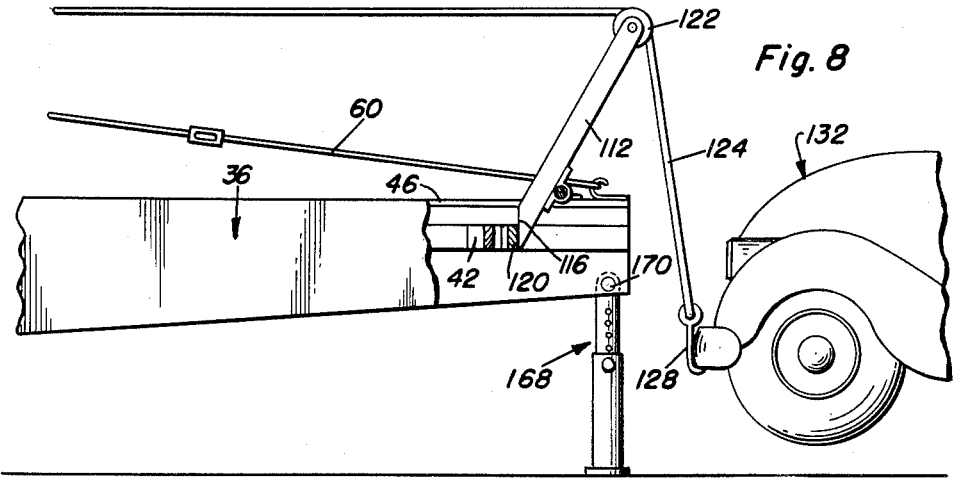
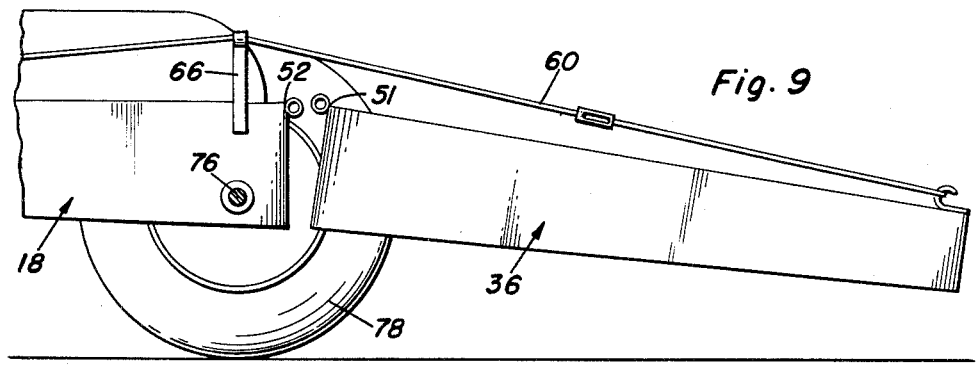
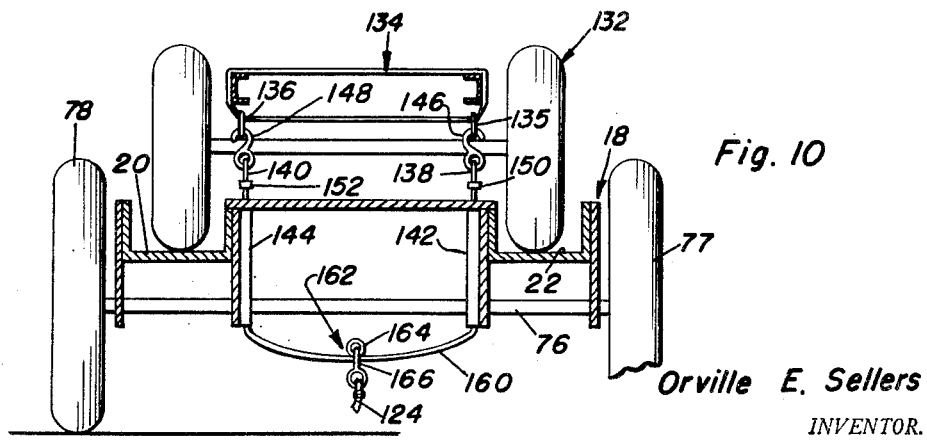
Orville E. Sellers
INVENTOR.

Patented Dec. 15, 1953

2,662,655

UNITED STATES PATENT OFFICE 2,662,655

SELF-LOADING TRAILER

Orville E. Sellers, Johnstown, Pa.

Application May 26, 1950, Serial No. 164,535

2 Claims. (Cl. 214—523)

This invention relates to improvements in trailers.

An object of this invention is to transport a disabled vehicle from its location to another by retaining the entire vehicle in a position above the road and on a trailer and to so construct the trailer that it is in sections with one section foldable upon the other so that said trailer may be easily moved from one position to another and to prevent objectionable protrusion from the rear of the vehicle which is towing the trailer.

Another object of this invention is to render it possible to avoid the large expense of purchasing a conventional wrecker or tow track and to use an ordinary lighter truck or if the circumstances require, another automobile.

A further object of this invention is to provide an improved trailer capable of being used to display automobiles when it is not used for moving disabled vehicles from one position to another, said trailer being made in sections and hinged together, but the hinge pin being removable so that one section may be placed upon the other for transportation thereof, and said trailer being provided with various attachments making it possible to place the vehicle on the trailer in an easy and expeditious manner.

Other objects and features will become apparent in following the description of the illustrated forms of the invention.

In the drawings:

Figure 1 is a plan view of one form of the invention showing a suggested means of attaching it to a truck;

Figure 2 is an elevational view of the trailer of Figure 1;

Figure 8 is a fragmentary elevational view with parts broken away in section, of a slightly modified form of the invention showing an attachment for raising the front end of a vehicle;

Figure 9 is a fragmentary side view showing a modification of the invention whereby the rear section may be removed from the front section and then disposed thereon, and;

Figure 10 is a transverse sectional view of the device illustrating a suggested hold-down mechanism which may be attached to a part of a vehicle on the trailer.

Figure 3:
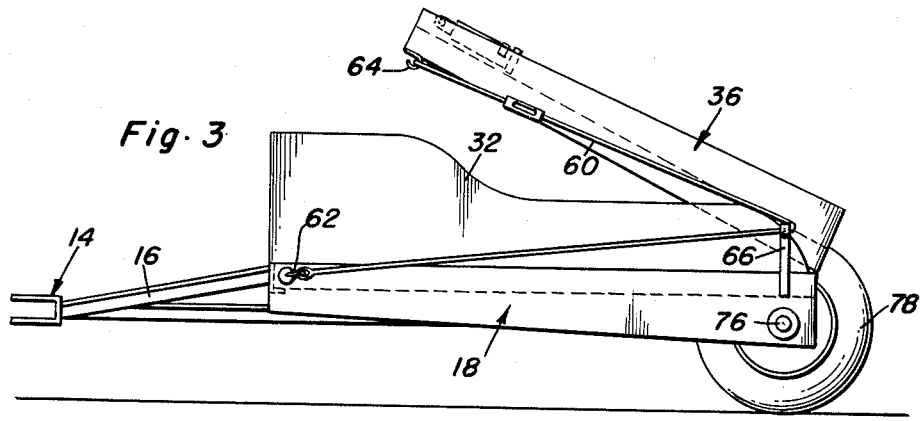
Figure 3 is an elevational view of a slightly modified form of the invention, this view illustrating that the winding drum assembly and stands at the rear of the trailing section may be omitted if found desirable.
Figure 4:
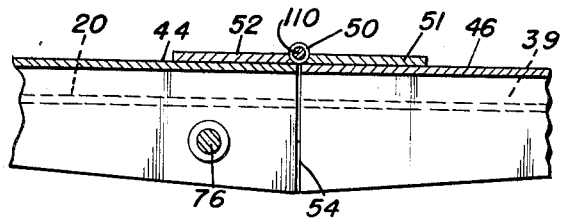
Figure 4 is an enlarged fragmentary detail of construction and taken substantially on the line 4—4 of Figure 1 and in the direction of the arrows.

In view of the necessity of towing disabled vehicles, whether they are trucks, buses or automobiles or any other type of conveyance, it has been the practice of garages to own a tow truck. Such tow trucks are expensive insofar as initial cost is concerned and they may be used substantially for the sole purpose of towing or pushing disabled vehicles.

In many instances, it is preferable to lift the entire vehicle from the ground and transport it. Ordinary tow trucks in most instances will not be capable of such performance. Moreover, the initial expense of a tow truck is prohibitive in some instances.

The instant invention has been designed specifically to obviate the necessity of a tow truck. An ordinary and conventional vehicle, as a pickup truck 10, is provided with a drawbar 12 which is adapted to be connected with the trailer hitch 14 at the forward end of the draft or tongue 16. The draft 16 is disposed at the front end of the section 18 which forms a part of the trailer. This section 18 consists of two spaced tracks 20 and 22 which are preferably of channel construction. They are held in spaced relationship by means of braces 24 forming a truss construction. Disposed beneath each track is a truss construction 25 (Figure 6) including side plates 28 and 30 which are rigidly fixed to the sides or legs of the channel-shaped tracks.

Said draft 16 is composed of sufficient structural braces attached to the front section, as found expedient and in accordance with the dictates of sound design principles. Said front section may be provided with sides 32 and 34 which not only add to the strength of the device but also may be used for advertising purposes.

Figure 6:
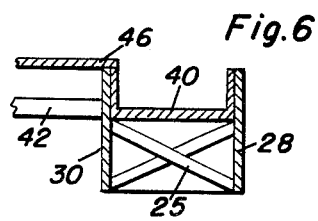
Figure 6 is an enlarged sectional view taken on the line 6—6 of Figure 1 and in the direction of the arrows.

The rear section 36 is composed of a pair of tracks 39 and 40 which are held in spaced relationship by the bracing 42. As shown in Figure 6, each track 39 and 40 is provided with side plates 28 and 30 and the truss construction 25 therebetween in order to insure the necessary rigidity and strength of construction.

A cover plate 44 extends between the tracks 20 and 22, being welded or otherwise rigidly fixed thereto. A similar cover plate 46 extends between the channels 39 and 40, both adding to the rigidity of the construction and forming a surface to accommodate various elements, as tools.

A hinge 50 including hinge plates 51 and 52 is disposed between the sections 18 and 36. The hinge plate 51 is fixed to the plate 46, while the hinge plate 52 is fixed to the plate 44, the usual fastening means being employed, as welding or brazing. Any other fastening means may be employed as found desirable. This hingedly connects the rear section to the front section so that the rear section may be formed to a position on top of the front section (Figure 3).

Figure 5:
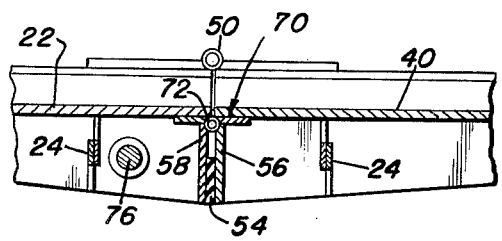
Figure 5 is an enlarged sectional view taken substantially on the line 5—5 of Figure 1 and in the direction of the arrows.
Figure 7:
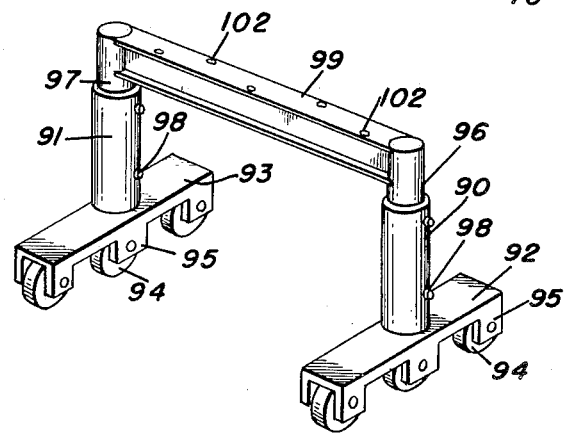
Figure 7 is a perspective view of a dolly which may be used in connection with the trailer.

Rubber bumpers 54 (Figure 5) are disposed between confronting end members 56 and 58 which are secured to the plate sides 28 and 30 of each channel-shaped track so as to form a resilient back preventing excessive hinged movement of the rear section with respect to the front section. To further insure the proper travel of one section with respect to another, a flexible elongated member, as the cable 60, is secured by means of a hook coupling 62 to the front part of one section and secured by means of a hook coupling 64 to the rear end of the rear section. This cable passes over a vertical guide or standard 66 which is carried by the front section and at the side thereof. There are two cable type stops provided, one being on each side of the trailer.

In order to form an additional lock for the two sections, a hinge 70 (see Figure 5) with a removable hinge pin 72 is disposed on the undersurface of confronting tracks. When the hinge pin is in place, the sections cannot be moved with respect to each other.

An axle 76 is passed through openings in the depending plates 28 and 30 for each front track 20 and 22. This axle has wheels 77 and 78 at the ends thereof, whereby the trailer may be moved from one position to another with the load being carried by the rear end of the front section.

A vertically adjustable dolly is suggested for use in connection with the device. This dolly includes vertical standards 90 and 91 having feet 92 and 93 at the lower ends of each. These feet have wheels 94 carried in brackets 95 which depend from and form a part of said feet. Vertically adjustable columns 96 and 97 are disposed in the tubes or standards 90 and 91 and pins 98 passing through suitable openings in the columns and tubes retain the crossbar 99 in the selected vertical position. This crossbar is adapted to be secured beneath the injured vehicle so that it may be pulled on the trailer by means of a winch 100 or by any source of power as by the simple attachment of a cable to the rear bumper of another vehicle and by pulling the vehicle dolly forward thereby carrying the incapacitated vehicle therewith. A plurality of openings 102 are provided in the member 99 whereby fastening devices, as U-bolts or clamps may be secured thereto to serve the purpose of pulling the dolly and/or fastening the dolly to the incapacitated vehicle.

In operation the trailer is attached to the drawbar 12 of the vehicle 10. It is then moved to the place or location where the incapacitated vehicle is disposed. At that time an ordinary jack may be placed under the draft 16 of the trailer to lift the front end thereof or, by manually lifting it and rotating it about the axle 76 as an axis, to hold the front end of the trailer elevated. Of course, all of this takes place after the rear section 36 has been hinged about the hinge 50 as an axis and the hinge pin 72 inserted appropriately. The vehicle is drawn on the trailer riding up the track.

When the vehicle is so located on the trailer that the front end tends to press downwardly against the ordinary jack which is placed thereunder, this jack may be lowered until the coupling or hinge 14 may be secured again to the drawbar 12.

In Figure 3 one suggested use of the sections in folding is illustrated. In Figure 9 there is a second suggestion. The hinge pin 110 for the hinge 50 may be removed (Figure 2) and the rear section 36 lifted and slid on the forward section 18. In this respect the modification of Figure 9 differs from that of Figures 1 and 3. In Figure 1 and also in Figure 8, which is in structure similar to the device in Figure 9, there are several attachments. The function of Figure 3 is to show that some of the attachments may be omitted. A standard 112 is pivoted on the hinge pin 114 to the plate 46 and is capable of being swung upward to a position shown in Figure 8, at which time the beveled end portion 116 thereof engages the stop 120. A roller or pulley 122 forming a guide is disposed at the upper end of the standard 112 in order to prescribe the path of movement of the cable 124. As is apparent from inspection of Figure 8 a disabled vehicle may be attached by means of a hook or hooks 126 to the cable 124 and then lifted by pulling on the cable. The pulling force may come from the winding drum or winch 100 or from the winding drum or winch assembly 130, which is purely conventional in nature but located on the tongue which is attached to the forward end of the front section 18.

A hold-down assembly is provided in the device for the purpose of attaching the vehicle to the trailer and holding it firmly in place. The hold-down device is shown best in Figure 10 wherein a part of the under carriage of the fragmentarily illustrated vehicle 132 is provided with a cable 134 having eyes 135 and 136 attached thereto. This cable is illustrative of any conventional type of fastener, as a chain or the like. Also, the chain or cable 136 may be attached to any convenient part of the vehicle, preferably to the under carriage thereof, the user of the device exercising his judgment as to which parts should be held firm.

A pair of rods 138 and 140 respectively are vertically slidable in the guides 142 and 144 which are fixed to the tracks by welding or other suitable means. Hooks 146 and 148 are attached to the upper ends of the rods 138 and 140 and are adapted to fasten in the eyes 135 and 136. Collars 150 and 152 respectively are fixed to the vertically slidable rods 138 and 140 to engage the upper surface of the guides 142 and 144 or the upper surface of the plate 44 to limit the downward movement of the rods 138 and 140 and also to prevent separation thereof from the remainder of the trailer. A cable 160 is secured to the lower ends of the rods 138 and 140 and has a pulley assembly 162 disposed thereon. This pulley assembly consists of a guide pulley 164 which is mounted on the cable 160 together with an eye bolt 166 which is secured thereto. The cable 124 is adapted to be fastened in the eye of the eye bolt 166 in order to pull it down tightly. The function of the assembly 162 is to provide an equal force on each rod 138 and 140.

Referring primarily to Figure 8 it will be noted that a jack stand 168 of the extensibly adjustable type is pivoted by means of the pin 170 to the rear end of the track 40. A similar jack stand is provided at the rear end of the rail 40 so that the device may be held in place when displaying a vehicle or may be held in place when lifting a vehicle as disclosed in Figure 8. A spring clip 172 (Figure 2) which is attached to the rear section is employed to releasably hold the jack stand in the up position. Of course, other types of latches may be used in this connection.

Having described the invention, what is claimed as new is:

1. In a device for transporting vehicles, a trailer comprising a front section and a rear section, each of said sections having tracks to support vehicle wheels, means releasably connecting said sections together, a tongue attached to one of said sections and having a winch disposed thereon with a cable extending therefrom, the other of said sections having standard pivoted thereto with said cable entrained therearound to lift a disabled vehicle, and a stop secured to the last-mentioned section and disposed in the path of pivotal movement of said standard to limit the travel of said standard in one direction and retain said standard in an upright position.

2. The combination of claim 1 and a mechanism carried by one of said sections to hold the vehicle down thereon tightly, and said mechanism having means thereon for attachment to said cable for retaining the vehicle down tightly.

ORVILLE E. SELLERS.

References Cited in the file of this patent

UNITED STATES PATENTS

| Number | Name | Date |
| --- | --- | --- |
| 1,249,793 | McCauley | Dec. 11, 1917 |
| 1,300,649 | Raymond | Apr. 15, 1919 |
| 1,544,477 | Palotce | June 30, 1925 |
| 1,862,682 | Judd | June 14, 1932 |
| 1,949,156 | Francis et al. | Feb. 27, 1934 |
| 1,949,172 | Miller | Feb. 27, 1934 |
| 2,080,709 | Hall et al. | May 18, 1937 |
| 2,100,694 | Judd | Nov. 30, 1937 |
| 2,216,972 | Gibson et al. | Oct. 8, 1940 |
| 2,345,789 | Brooks | Apr. 4, 1944 |
| 2,564,111 | Kimball | Aug. 14, 1951 |

FOREIGN PATENTS

| Number | Country | Date |
| --- | --- | --- |
| 103,814 | Australia | Apr. 26, 1938 |